United States Patent
Puente Pestaña et al.

(10) Patent No.: US 12,015,971 B2
(45) Date of Patent: Jun. 18, 2024

(54) METHODS FOR PROCESSING ENCRYPTED DOMAIN NAME SERVER, DNS, QUERIES RECEIVED FROM USER EQUIPMENT IN A TELECOMMUNICATION NETWORK

(71) Applicant: Telefonaktiebolaget LM Ericsson (publ), Stockholm (SE)

(72) Inventors: Miguel Angel Puente Pestaña, Madrid (ES); Miguel Angel Muñoz De La Torre Alonso, Madrid (ES); Maria Luisa Mas Rosique, Tres Cantos (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 744 days.

(21) Appl. No.: 17/054,819

(22) PCT Filed: Jul. 11, 2018

(86) PCT No.: PCT/EP2018/068740
§ 371 (c)(1),
(2) Date: Nov. 12, 2020

(87) PCT Pub. No.: WO2019/223887
PCT Pub. Date: Nov. 28, 2019

(65) Prior Publication Data
US 2021/0243170 A1      Aug. 5, 2021

(30) Foreign Application Priority Data
May 21, 2018    (EP) .................................... 18382348

(51) Int. Cl.
*H04L 29/06*        (2006.01)
*G06F 21/00*        (2013.01)
(Continued)

(52) U.S. Cl.
CPC ........... *H04W 4/50* (2018.02); *H04L 61/4511* (2022.05); *H04L 63/0428* (2013.01); *H04W 8/08* (2013.01);
(Continued)

(58) Field of Classification Search
None
See application file for complete search history.

(56) References Cited

U.S. PATENT DOCUMENTS

2017/0093802 A1*   3/2017   Norum ................ H04L 63/0428
2019/0268305 A1*   8/2019   Xu ..................... H04L 61/5007

OTHER PUBLICATIONS

PCT International Search Report and Written Opinion mailed Feb. 18, 2019 for International Application No. PCT/EP2018/068740, 11 pages.
(Continued)

*Primary Examiner* — Lisa C Lewis
(74) *Attorney, Agent, or Firm* — Sage Patent Group

(57) ABSTRACT

A method of processing a Domain Name Server, DNS, query received from a User Equipment, UE, in a telecommunication network, wherein said method comprises the steps of receiving (102), by a User Plane Function, UPF, an encrypted message from said UE, determining (103), by said UPF, that said encrypted message is an encrypted DNS query by establishing that a destination address in said encrypted message corresponds to an address of a DNS server comprised by said telecommunication network, and forwarding (104), by said UPF, said encrypted DNS query to said DNS server.

8 Claims, 6 Drawing Sheets

(51) Int. Cl.
*H04L 9/40* (2022.01)
*H04L 61/4511* (2022.01)
*H04W 4/50* (2018.01)
*H04W 8/08* (2009.01)
*H04W 8/18* (2009.01)
*H04W 8/20* (2009.01)

(52) U.S. Cl.
CPC ............ *H04W 8/18* (2013.01); *H04W 8/186* (2013.01); *H04W 8/20* (2013.01)

(56) References Cited

OTHER PUBLICATIONS

3GPP, 3GPP TS 23.787 V0.3.0, Technical Specification Group Services and System Aspects, "Study on Encrypted Traffic Detection and Verification", (Release 16), (Apr. 2018), Valbonne, France, 38 pages.

3GPP, 3GPP TS 29.561 V0.5.0, Technical Specification Group Core Network and Terminals, 5G System, "Interworking Between 5G Network and External Data Networks", Stage 3 (Release 15), (Apr. 2018), Valbonne, France, 42 pages.

3GPP, 3GPP TS 23.501 V15.0.0, Technical Specification Group Services and System Aspects, "System Architecture for the 5G System", Stage 2 (Release 15), (Dec. 2017), Valbonne, France, 181 pages.

* cited by examiner

METHODS FOR PROCESSING ENCRYPTED DOMAIN NAME SERVER, DNS, QUERIES RECEIVED FROM USER EQUIPMENT IN A TELECOMMUNICATION NETWORK

TECHNICAL FIELD

The present disclosure relates to Domain Name Server, DNS, queries and, more specifically, to methods of processing encrypted DNS queries in a telecommunication network.

CROSS-REFERENCE TO RELATED APPLICATIONS

This application is a 35 U.S.C. § 371 national stage application for International Application No. PCT/EP2018/068740, entitled "METHODS FOR PROCESSING ENCRYPTED DOMAIN NAME SERVER, DNS, QUERIES RECEIVED FROM USER EQUIPMENT IN A TELECOMMUNICATION NETWORK", filed on Jul. 11, 2018, which claims priority to EP Patent Application No. 18382348.3, filed on May 21, 2018, the disclosures and contents of which are hereby incorporated by reference in their entireties.

BACKGROUND

The present disclosure is directed to the concept of Domain Name Server, DNS, queries. DNS is considered a hierarchical decentralized naming system for computers, services, or other resources connected to a public network like the internet or connected to a private network. It associates various information with domain names assigned to each of the participating entities. Most prominently, it translates more readily memorized domain names to numerical IP addresses needed for locating and identifying computer services and devices with the underlying network protocols. By providing a worldwide, distributed directory service, the Domain Name System is an essential component of the functionality on the Internet.

The DNS delegates the responsibility of assigning domain names and mapping those names to Internet resources by designating authoritative name servers for each domain. Network administrators may delegate authority over sub-domains of their allocated name space to other name servers. This mechanism provides distributed and fault tolerant service and was designed to avoid a single large central database.

The present disclosure mainly focusses on a fifth Generation, 5G, network architecture, but may also be applicable for other types of networks.

Currently, different drafts exist that propose DNS encryption to, for example, prevent middleboxes to detect DNS traffic. These proposals may focus on the concept of performing DNS over HTTP/2, DNS over TLS, DNSCrypt, etc. It is foreseen that, at least in 5G networks, most DNS traffic will be encrypted.

There is an increasing trend for encrypting the user plane traffic going through operator's networks. Most applications run over HTTPS today. In the mid/long term, QUIC is a likely candidate to become the main transport protocol in the User Plane.

As mentioned above, even the DNS traffic is expected to be encrypted in the 5G time frame. One of the main challenges for the operator is to continue providing the same traffic management functionality when the user's traffic is encrypted.

SUMMARY

It is an object of the present disclosure to provide for methods of handling encrypted Domain Name System, DNS, queries received from User Equipment, UE.

It is another object of the present disclosure to provide for nodes operable in a telecommunication network, wherein the nodes are able to handle encrypted DNS queries received from UE.

In a first aspect, there is provided a method of processing a Domain Name Server, DNS, query received from a User Equipment, UE, in a telecommunication network.

The method comprises the steps of:

receiving, by a User Plane Function, UPF, an encrypted message from said UE;

determining, by said UPF, that said encrypted message is an encrypted DNS query by establishing that a destination address in said encrypted message corresponds to an address of a DNS server comprised by said telecommunication network;

forwarding, by said UPF, said encrypted DNS query to said DNS server.

The present disclosure focusses on several nodes/functions that may be present in a fifth Generation, 5G, telecommunication network. Here below, a summary of these nodes/functions are provided for readability purposes.

A Policy Control Function, PCF, may support unified policy framework to govern network behaviour. It may also implement a Front End, i.e. PCF FE, to access subscription information relevant for policy decisions in a Unified Data Repository, UDR.

A Session Management Function, SMF may be responsible for Session establishment, modification and release, including selection and control of the User Plane Function, UPF, entities.

A User Plane Function, UPF. This function may handle the user data traffic and optionally includes Deep Packet Inspection, DPI, functionality. DPI technology comprises inspecting/analysing the contents of the IP data packets beyond the so called IP 5 tuples. The so-called IP 5 tuples consist on the heading elements of an IP data packet comprising: IP source address, IP destination address, source transport address, destination transport address, and protocol over IP (e.g. TCP, UDP). Therefore, put in short terms, DPI technology consists in inspecting and analysing the application layer information conveyed by IP data packets. As a result of the DPI analysis, it can be obtained service classification information, which consists on IP packets being classified—i.e. after DPI processing—according to a configured tree of rules so that they are assigned to a particular service session.

A Network Exposure Function, NEF, translates between information exchanged with the external AF and information exchanged with the internal network functions.

A Network Resource Function, NRF, supports service discovery functionality.

It was one of the insights of the inventors that the UPF is able to determine that a particular encrypted message is an encrypted DNS query by establishing that a destination address in the encrypted message corresponds to an address of a DNS server comprised by the telecommunication network.

Such information may, subsequently, be used by the UPF within the telecommunication network. The UPF may not know what the DNS request exactly entails, as the DNS query is encrypted, but the UPF may at least know that the message is a DNS query. This allows the telecommunication network operator to provide already existing traffic management functionality to the UE's for traffic that is encrypted. It further allows the operator to control the DNS traffic. It even further allows the operator to retrieve and store new PFD rules which may be available to all UPFs in the telecommunication network of the operator.

In an example, the method further comprises the steps of:
forwarding, by said UPF, to a Session Management Function, SMF, comprised by said telecommunication network, a usage report thereby indicating said SMF of said received encrypted DNS query;
receiving, by said UPF, from said SMF, a usage report acknowledgement.

The above described example enables the SMF to act on the detection of the encrypted DNS query by the UPF.

In a second aspect, there is provided a method of activating encrypted Domain Name System, DNS, query functionality for a User Equipment, UE, in a telecommunication network.

The method comprises the steps of:
receiving, by a Policy Control Function, PCF, from a Session Management Function, SMF, a policy create message, wherein said policy create message comprises a subscriber identification, ID, of said UE;
retrieving, by said PCF, from a Unified Data Repository, UDR, a subscriber policy profile of said UE using said subscriber ID, wherein said subscriber policy profile comprises an indication that said UE is subject to encrypted DNS query functionality;
activating, by said PCF, encrypted DNS query functionality for said UE.

It is noted that each of the aspects of the present disclosure are based on a single inventive concept. However, each of the aspects are drafted from different points of view. The first aspect of the present disclosure is drafted from the point of view of the User Plane Function. The second aspect of the present disclosure is drafted from the point of view of the Policy Control Function, PCF. The third aspect of the present disclosure is drafted from the point of view of a Session Management Function, SMF.

The above described second aspect of the present disclosure is directed to the PCF. The PCF may receive a subscriber ID of the UE in a policy create message. Based on the subscriber ID of the UE, the PCF may retrieve, from a UDR, a subscriber policy profile of the UE to determine whether the UE is subject to encrypted DNS query functionality. That is, the PCF determines whether the UE is able, and/or allowed, to send encrypted DNS queries within the telecommunication network. If this is confirmed, the PCF may activate the encrypted DNS query functionality for the UE within the telecommunication network.

In an example, the step of activating comprises:
sending, by said PCF, to said SMF, a policy create message comprising an indication that said UE is subject to encrypted DNS query functionality.

In a third aspect, there is provided a method of supporting encrypted Domain Name Server, DNS, query functionality for a User Equipment, UE, in a telecommunication network.

The method comprises the steps of:
receiving, by a Session Management Function, SMF, from a Policy Control Function, PCF, a policy create message comprising an indication that said UE is subject to encrypted DNS query functionality;
sending, by said SMF, to a User Plane Function, UPF, a session establishment/modification request, wherein said request comprises a usage report rule for request said UPF to notify said SMF of received encrypted DNS queries origination from said UE.

Here, the method may further comprise the steps of:
receiving, by said SMF, from said UPF, a usage report thereby indicating said SMF of a received encrypted DNS query originating from said UE;
sending, by said SMF to said UPF, a usage report acknowledgement.

In a further example, the method comprises the steps of:
sending, by said SMF, to a DNS server comprised by said telecommunication network, a Internet Protocol, IP, address query message, wherein said IP address query message comprises an IP address of said UE;
receiving, by said SMF, from said DNS server, an IP address query response message, wherein said IP address query response message comprises an IP address and a Domain corresponding to said DNS query origination from said UE.

Here, the further steps may be incorporated.
sending, by said SMF, to said UPF, a session modification request message, wherein said session modification request message comprises said IP address and said Domain corresponding to said DNS query origination from said UE;
receiving, by said SMF, from said UPF, a session modification response message.

In a fourth aspect, there is provided a User Plane Function, UPF, arranged for processing a Domain Name Server, DNS, query received from a User Equipment, UE, in a telecommunication network, wherein said UPF comprises:
receive equipment arranged for receiving an encrypted message from said UE;
process equipment arranged for determining that said encrypted message is an encrypted DNS query by establishing that a destination address in said encrypted message corresponds to an address of a DNS server comprised by said telecommunication network;
transmit equipment arranged for forwarding said encrypted DNS query to said DNS server.

It is noted that advantages as explained with respect to the first aspect, the second aspect and the third aspect of the present disclosure are also applicable for the fourth aspect of the present disclosure and further.

In an example, said transmit equipment is further arranged for forwarding, to a Session Management Function, SMF, comprised by said telecommunication network, a usage report thereby indicating said SMF of said received encrypted DNS query, and wherein said receive equipment is further arranged for receiving, from said SMF, a usage report acknowledgement.

In a fifth aspect of the present disclosure, here is provided a Policy Control Function, PCF, arranged for activating encrypted Domain Name System, DNS, query functionality for a User Equipment, UE, in a telecommunication network.

The PCF comprises:
receive equipment arranged for receiving, from a Session Management Function, SMF, a policy create message, wherein said policy create message comprises a subscriber identification, ID, of said UE;
retrieve equipment arranged for retrieving, from a Unified Data Repository, UDR, a subscriber policy profile of said UE using said subscriber ID, wherein said subscriber policy profile comprises an indication that said UE is subject to encrypted DNS query functionality;
activate equipment arranged for activating encrypted DNS query functionality for said UE.

In an example, the activate equipment is further arranged for sending, to said SMF, a policy create message comprising an indication that said UE is subject to encrypted DNS query functionality.

In a sixth aspect of the present disclosure, there is provided a Session Management Function, SMF, arranged for supporting encrypted Domain Name Server, DNS, query functionality for a User Equipment, UE, in a telecommunication network.

The SMF comprises:
  receive equipment arranged for receiving, from a Policy Control Function, PCF, a policy create message comprising an indication that said UE is subject to encrypted DNS query functionality;
  transmit equipment arranged for sending, to a User Plane Function, UPF, a session establishment/modification request, wherein said request comprises a usage report rule for request said UPF to notify said SMF of received encrypted DNS queries origination from said UE.

In an example, the receive equipment is further arranged for receiving, from said UPF, a usage report thereby indicating said SMF of a received encrypted DNS query originating from said UE, and wherein said transmit equipment is further arranged for sending, to said UPF, a usage report acknowledgement.

In a further example, the transmit equipment is further arranged for sending, to a DNS server comprised by said telecommunication network, a Internet Protocol, IP, address query message, wherein said IP address query message comprises an IP address of said UE, and wherein said receive equipment is further arranged for receiving, from said DNS server, an IP address query response message, wherein said IP address query response message comprises an IP address and a Domain corresponding to said DNS query origination from said UE.

In yet another example, the transmit equipment is further arranged for sending, to said UPF, a session modification request message, wherein said session modification request message comprises said IP address and said Domain corresponding to said DNS query origination from said UE, and wherein said receive equipment is further arranged for receiving, from said UPF, a session modification response message.

In a seventh aspect, there is provided a computer program product containing computer program code which, when executed by a processor of a node in a telecommunication network, cause node to implement the method according to any of the method examples as provided above.

In the context of the present invention, a module, device, equipment, or the like may also be implemented as a computer program running on the processor.

The expressions, i.e. the wording, of the different aspects comprised by the nodes according to the present invention should not be taken literally. The wording of the aspects is merely chosen to accurately express the rationale behind the actual function of the aspects.

In accordance with the present invention, different aspects applicable to the above mentioned examples of the method, including the advantages thereof, correspond to the aspects which are applicable to any of the nodes according to the present disclosure.

DETAILED DESCRIPTION

Figure 1:
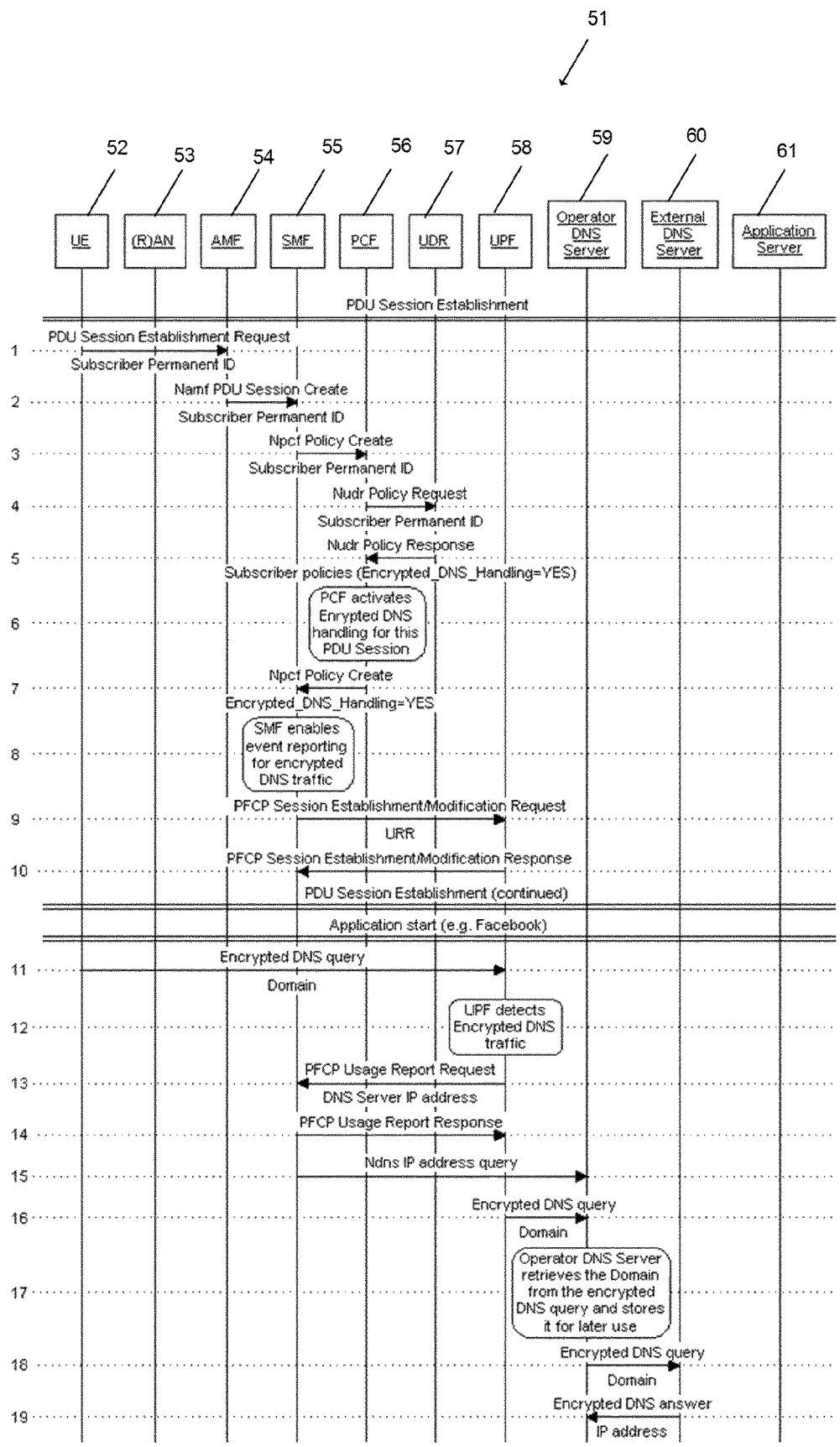
FIG. 1 shows a signalling diagram in accordance with an example of the present disclosure.

FIG. 1 shows a signalling diagram 51 in accordance with an example of the present disclosure.

The method steps are indicated with the reference numerals 1-19, and the nodes involved in the process are indicated with the reference numerals 52-61.

It is assumed that a particular User Equipment, UE, is registered in the telecommunication network, for example a fifth Generation, 5G, telecommunication network, but that there is no session yet established, for example a Protocol Data Unit, PDU, session.

It is noted that the steps as provided provide for a high level overview of the steps that are involved in a session establishment procedure between the UE 52 and the telecommunication network. Not all the steps are depicted for readability reasons.

In a first step 1, a PDU session establishment request message is sent from the UE 52 to the Access &. Mobility management Function 54. The message is sent via a Radio Access Network 53, more specifically via a gNodeB, eNodeB, or something alike.

The PDU session establishment request message may comprise a subscriber permanent Identification, SUPI. This may be a unique identification for the particular UE 52. The following have been identified as SUPI types that may be valid for the present disclosure: International Mobile Subscriber Identity, IMSI, and Network Access Identifier, NAI. By using the NAI, it will be possible to also use non-IMSI based SUPIs.

It is possible for a representation of the IMSI to be contained within the NAI for the SUPI e.g. when used over a non-3GPP Access Technology. In order to enable roaming scenarios, the SUPI may contain the address of the home network.

Upon receiving the PDU session establishment request message, the AMF 54 may select an Session Management Function, SMF, 55 and may sent 2 the subscriber identification to the SMF 55 in a PDU session create message. The SMF 55 may select a Policy Control Function, PCF, 56 and may sent 3 the Permanent Subscriber ID in a Policy Create message.

In steps 4 and 5, the PCF 56 may retrieve the subscriber policy profile from a Unified Data Repository, UDR, 57. In this particular situation, it is considered that the UE 52 is entitled to, i.e. subject to, encrypted DNS functionality. This part is explained in more detail further below.

In steps 6 and 7, the PCF 56 may activate encrypted DNS handling functionality for this PDU session in the SMF 55. The activation for the functionality described in the present disclosure could be per subscriber, User Equipment, for a subscriber on certain DNN/APN or for any other session specific conditions. It could also be activated when local policy conditions are met.

In step 8, the SMF 55 may enable event reporting for encrypted DNS traffic for this particular UE 52, or corresponding to DNS queries for this particular session.

In steps 9 and 10, the SMF 55 sends a session establishment/modification request message to the User Plane Function, UPF, 58, and the UPF 58 may sent a session establishment/modification response message back to the SMF 55.

Steps 1-10 are thus directed to the establishment of a session for the UE 52 with the telecommunication network. The remaining of the steps are directed to the situation in which the UE 52 initiates a particular application. These steps are elucidated in more detail here below.

In step 11, the UE 52 sends an encrypted DNS query to the UPF 58. The UPF 52 receives the encrypted DNS query but is not able to see the content thereof. As such, according to the present disclosure, the UPF 52 is able to determine that the received message is an encrypted DNS query by establishing that a destination address in said received encrypted message corresponds to an address of a DNS server 59 comprised by the telecommunication network. This is indicated with reference numeral 12.

Encrypted DNS is, for example, DNS over HTTP/2, i.e. protocol stack being DNS over HTTP/2 over TLS over TCP over IP. The TCP connection establishment and TLS handshake are not shown in the sequence diagram for simplicity purposes. UPF 57 detects that this is DNS traffic, e.g. through SPI or L3 inspection by checking that the destination IP address is the one of the Operator's DNS Server.

Step 13 is directed to the step of forwarding, by said UPF 58, to a Session Management Function, SMF, 55 comprised by said telecommunication network, a usage report thereby indicating said SMF of said received encrypted DNS query, and Step 14 is directed to the step of receiving, by said UPF, 58 from said SMF 55, a usage report acknowledgement.

That is, the UPF 58 may trigger a PFCP Usage Report request to notify the SMF 55 of the detection of encrypted DNS traffic. The Sx/N4 PFCP protocol may be extended with a new Report Type, i.e. DNS Report. As part of this report, UPF 58 may also indicate the destination IP address, i.e. the DNS server IP address. Additionally, the UPF 58 might buffer the DNS message for some time.

The Report Type IE may be encoded as follows. It may indicate the type of the report the UP function sends to the CP function. Octet 5 may be encoded as follows:

Bit 1—DLDR (Downlink Data Report): when set to 1, this indicates Downlink Data Report Bit 2—USAR (Usage Report): when set to 1, this indicates a Usage Report Bit 3—ERIR (Error Indication Report): when set to 1, this indicates an Error Indication Report.

Bit 4—UPIR (User Plane Inactivity Report): when set to 1, this indicates a User Plane Inactivity Report.

Bit 5—DNSR (DNS Report): when set to 1, this indicates a DNS Report.

Bit 6 to 8—Spare, for future use and set to 0.

In step 15, the SMF 55 may trigger an IP address query message towards the operator DNS Server. This is a Service Based Architecture, SBA, based interface that is an added value feature to the DNS servers. In this IP address query message, SMF 55 ay include the UE IP address as parameter that will help operator's DNS Server to correlate with the DNS query received in Step 16.

It is noted that the SMF 55 may need to discover the operator DNS Server 59. The IP address of the operator DNS Server 59 may be retrieved from Step 13, but it could also be locally configured at the SMF 55. This may be done by triggering SBA Service Discovery procedure towards the NRF entity, so NRF responds back to SMF with the address of the Operator DNS Server 59.

In step 16, the UPF 58 forwards the encrypted DNS query towards the operator DNS Server 59. In step 17, the operator DNS Server 59 retrieves the Domain from the encrypted DNS query and may store it for later use. In step 18, the operator DNS Server 59 may follow the DNS hierarchy and may forward the DNS query message towards the External DNS Server 60.

In step 19, the External DNS Server 60 may receive the DNS query and based on the Domain of the application, may trigger a DNS answer towards the Operator DNS Server 59 including the, or the list of, IP address(es) for the requested domain.

Figure 2:
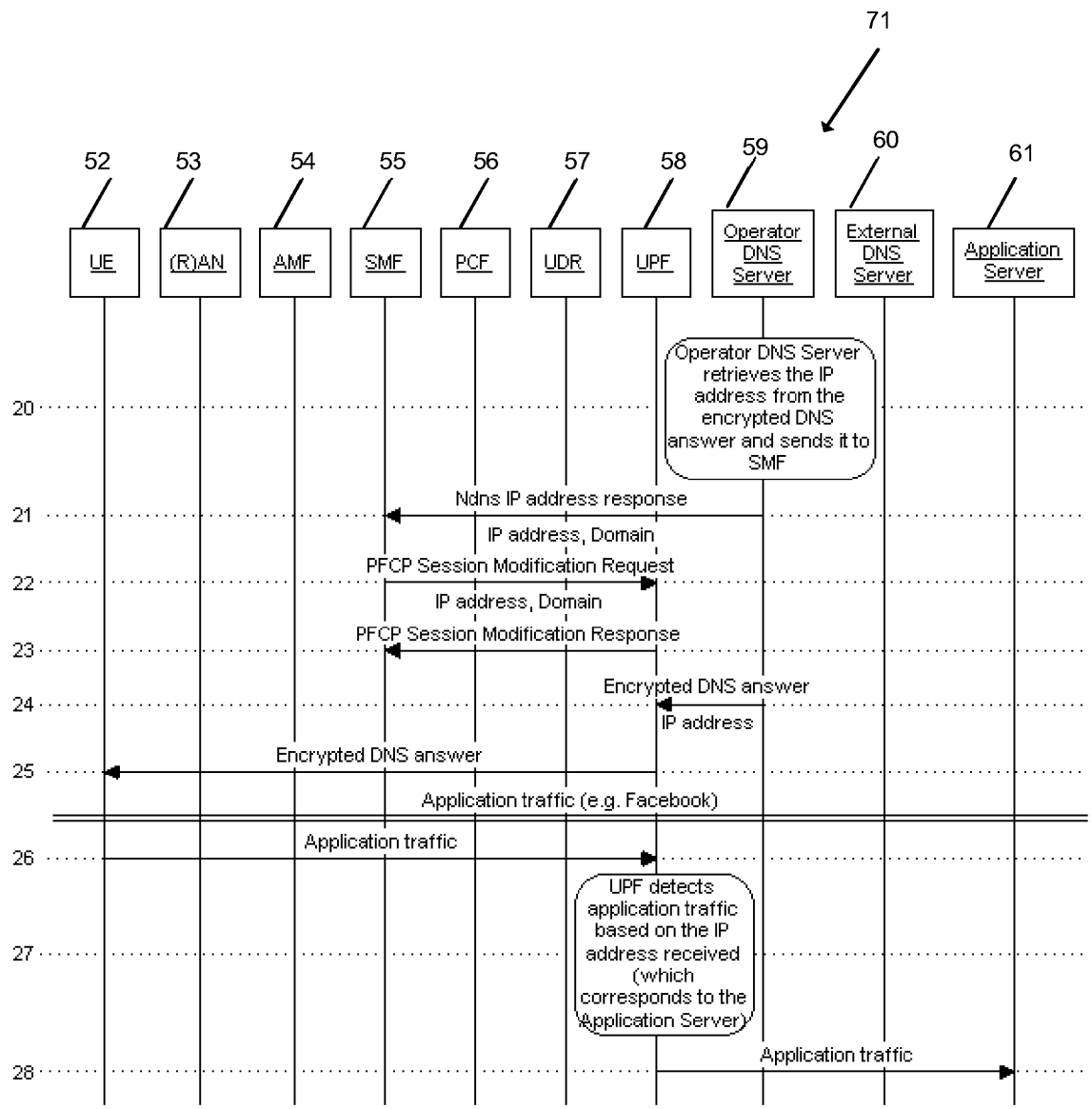
FIG. 2 shows a continuation of the signalling diagram shown in FIG. 1.

FIG. 2 shows a continuation 71 of the signalling diagram shown in FIG. 1.

In steps 20 and 21, the Operator DNS Server 59 may retrieve the IP address mentioned in Step 19 above from the encrypted DNS answer and together with the previously stored Domain, i.e. from Step 17, may send both parameters to the SMF 55 in the IP address response.

In step 22, the SMF 55 may send the IP address and Domain mentioned above to the UPF 58 by triggering a Session Modification request message.

In step 23, the UPF 58 may store the retrieved IP address and Domain and acknowledges the above message by answering with a Session Modification response message. In steps 24 and 25, the Operator DNS Server 59 forwards the DNS answer towards UE. In step 26, after the DNS procedure is completed, UE 52 starts application traffic towards the IP address of the Application Server 61.

In step 27, the UPF 58 may detect application traffic corresponding to the Domain received in Step 23 above as follows: UPF 58 may analyze the IP header of incoming uplink traffic and in case the destination IP address matches with the IP address received in Step 23 above, which corresponds to the Application Server, it classifies this traffic as pertaining to the target application. Same procedure for the incoming downlink traffic; In this case by matching the source IP address in the IP header. The UPF 58 may apply the corresponding Traffic Management actions, e.g. throttling, charging, etc., for the traffic matching this application.

In step 28, the UPF 58 may forward the application towards the Application Server.

The mechanism described above applies to DNS traffic encrypted with TLS. But it also applies to DNS traffic encrypted with other techniques, e.g. DNS over QUIC, protocol stack being DNS over HTTP/2 over QUIC over UDP over IP. The mechanism described above may apply to the case where the DNS traffic goes through an Operator DNS Server, i.e. it is assumed UE OS is configured with the Operator DNS Server/s. In this case, the Operator DNS Server may act as a Network Function in SBA architecture and may be able to support SBA interface.

The mechanism proposed above also applies to the case where the DNS traffic does not go through an Operator DNS Server. In this case, the external DNS Server may act as an external trusted Application Function, AF, and may be able to support SBA interface. Also, if the Operator's DNS Server is not part of Operator's internal SBA network, i.e. it sits out of Core Control Plane, it could also act as a trusted AF.

Finally, not shown in the FIGS. 1 and 2, the mapping between Domain and IP address(es), retrieved by Operator DNS server 59 at Step 20, can be sent from the Operator DNS Server 59 to the PFDF entity in NEF, by using the Nnef interface and the PFD rules provisioning service. This way the PFDF may have PFD rules, i.e. IP address(es) for that application corresponding to that Domain. Those new PFD rules will then be available to all UPFs in operator's network.

Figure 3:
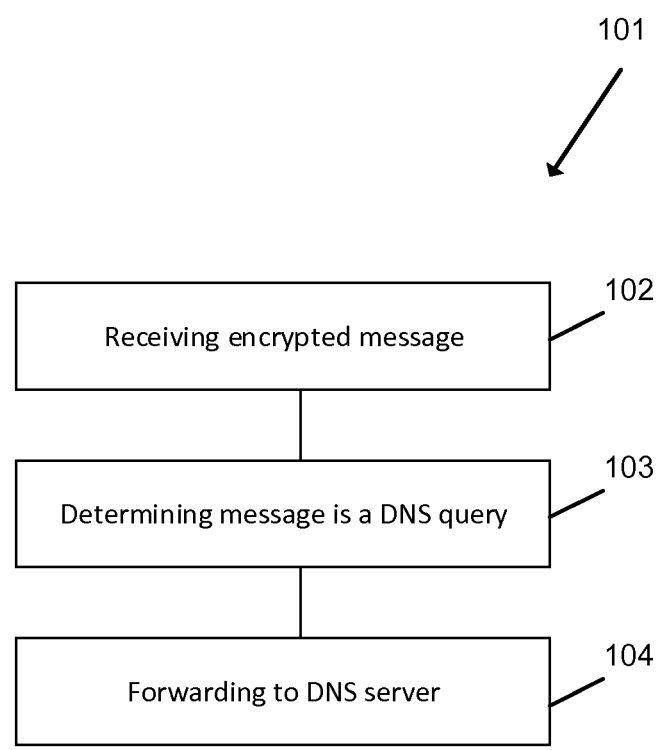
FIG. 3 shows an example of a flow chart in accordance with the present disclosure.

FIG. 3 shows an example of a flow chart 101 in accordance with the present disclosure.

The flow chart 101 is directed to a method of processing a Domain Name Server, DNS, query received from a User Equipment, UE, in a telecommunication network.

More particularly, the method is directed to the handling of encrypted DNS queries from the UE. One of the advantageous of DNS queries being encrypted is that the privacy aspect thereof can be upheld in a more secure manner. It is made more difficult to see the content of the encrypted DNS query is not accessible.

The method comprises the steps of:
  receiving 102, by a User Plane Function, UPF, an encrypted message from said UE;
  determining 103, by said UPF, that said encrypted message is an encrypted DNS query by establishing that a destination address in said encrypted message corresponds to an address of a DNS server comprised by said telecommunication network;
  forwarding 104, by said UPF, said encrypted DNS query to said DNS server.

Figure 4:
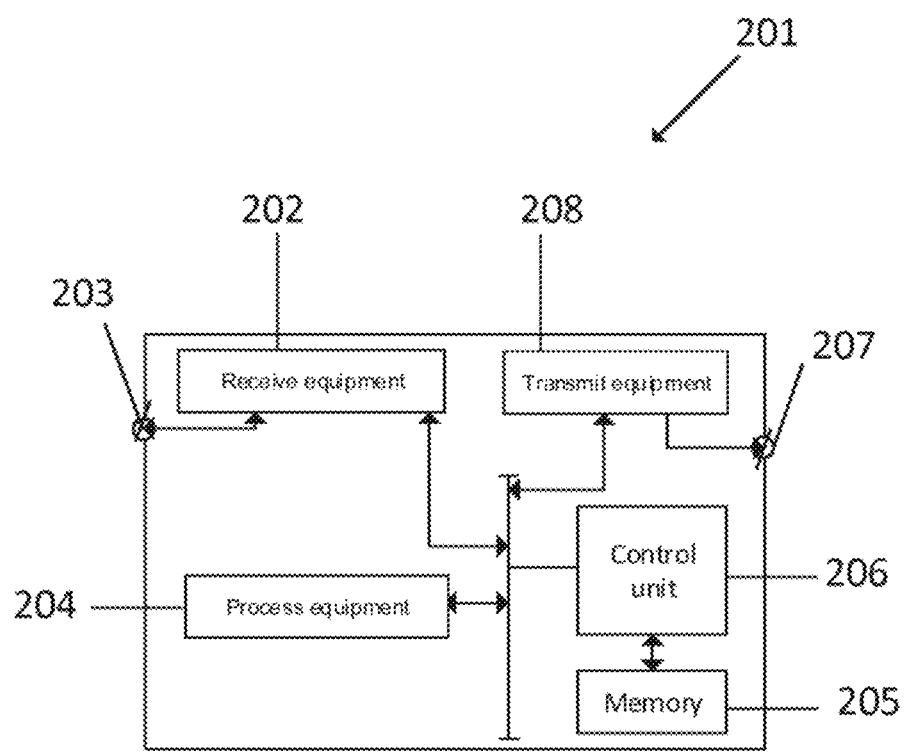
FIG. 4 shows an example of a User Plane Function, UPF, in accordance with the present disclosure.

FIG. 4 shows an example of a User Plane Function, UPF, 201 in accordance with the present disclosure.

The User Plane Function, UPF, 201 is arranged for processing a Domain Name Server, DNS, query received from a User Equipment, UE, in a telecommunication network. The UPF 201 comprises:
  receive equipment 202 arranged for receiving an encrypted message from said UE;
  process equipment 204 arranged for determining that said encrypted message is an encrypted DNS query by establishing that a destination address in said encrypted message corresponds to an address of a DNS server comprised by said telecommunication network, and
  transmit equipment 208 arranged for forwarding said encrypted DNS query to said DNS server.

The UPF further comprises a receive terminal 203 via which incoming packets or messages are received and handed over to the receive equipment. Further, a transmit terminal 207 is present via which packets or messages are sent to other nodes in the network.

A control unit 206 is comprised by the UPF 201, which control unit is connected to a memory 205, and to all the elements comprised by the UPF 201, i.e. the receive equipment, the transmit equipment 208 and the process equipment 204.

Figure 5:
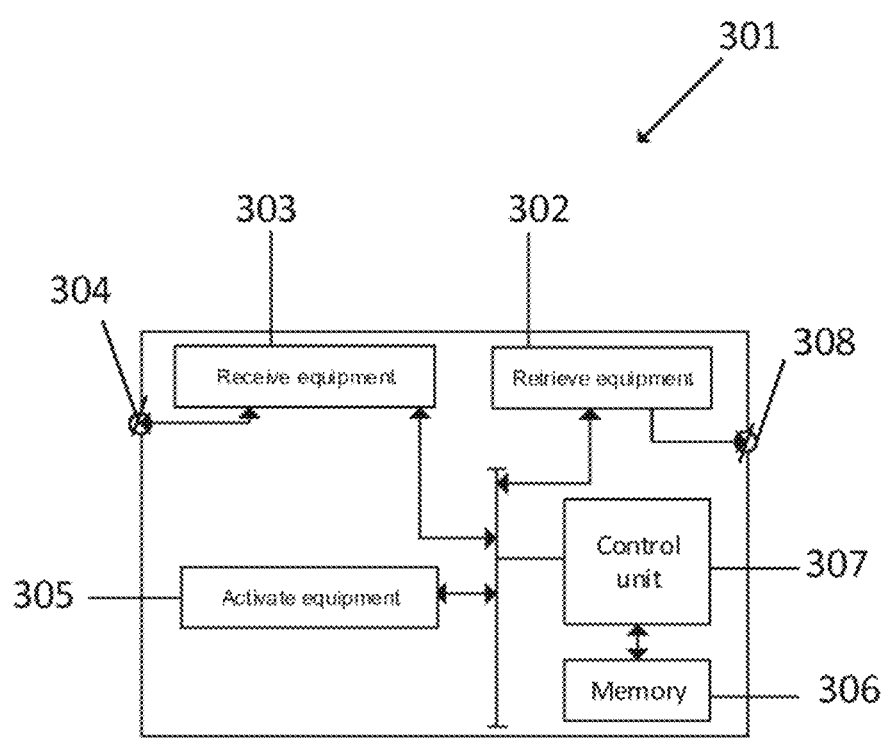
FIG. 5 shows an example of a Policy Control Function, PCF, in accordance with the present disclosure.

FIG. 5 shows an example of a Policy Control Function, PCF, 301 in accordance with the present disclosure.

The Policy Control Function, PCF, 301 is arranged for activating encrypted Domain Name System, DNS, query functionality for a User Equipment, UE, in a telecommunication network. The PCF 301 comprises:
  receive equipment 303 arranged for receiving, from a Session Management Function, SMF, a policy create message, wherein said policy create message comprises a subscriber identification, ID, of said UE;
  retrieve equipment 302 arranged for retrieving, from a Unified Data Repository, UDR, a subscriber policy profile of said UE using said subscriber ID, wherein said subscriber policy profile comprises an indication that said UE is subject to encrypted DNS query functionality, and
  activate equipment 305 arranged for activating encrypted DNS query functionality for said UE.

The PCF 301 further comprises a receive terminal 304 via which incoming packets or messages are received and handed over to the receive equipment. Further, a transmit terminal 308 is present via which packets or messages are sent to other nodes in the network.

A control unit 307 is comprised by the PCF 301, which control unit is connected to a memory 306, and to all the elements comprised by the PCF 301, i.e. the receive equipment, the retrieve equipment 302 and the activate equipment 305.

Figure 6:
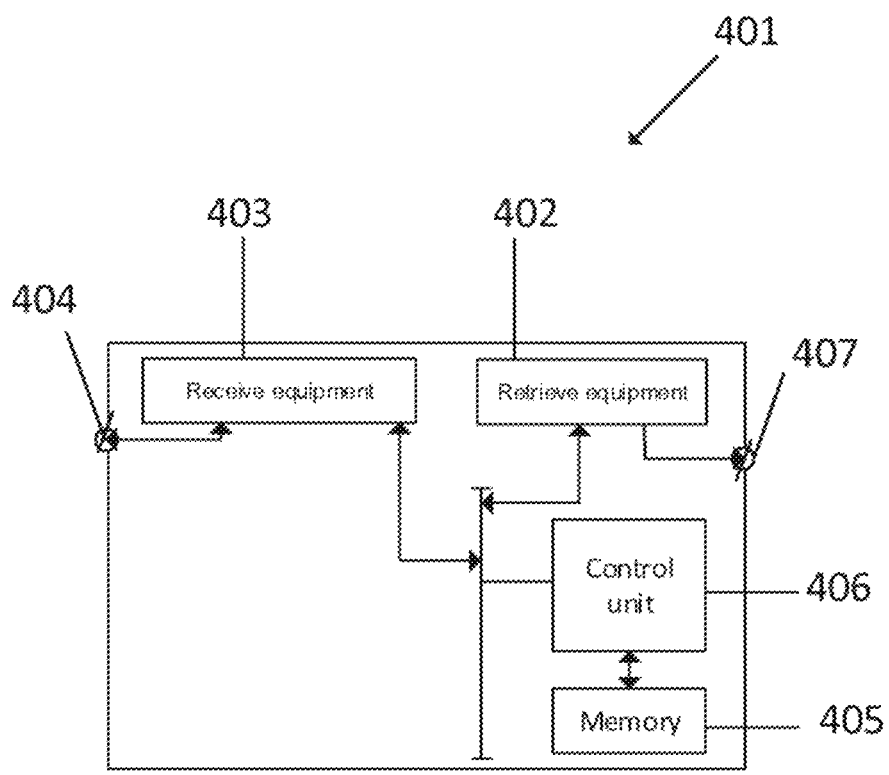
FIG. 6 shows an example of a Session Management Function, SMF, in accordance with the present disclosure.

FIG. 6 shows an example of a Session Management Function, SMF, 401 in accordance with the present disclosure.

The Session Management Function, SMF, 401 is arranged for supporting encrypted Domain Name Server, DNS, query functionality for a User Equipment, UE, in a telecommunication network. The SMF 401 comprises:
  receive equipment 403 arranged for receiving, from a Policy Control Function, PCF, a policy create message comprising an indication that said UE is subject to encrypted DNS query functionality, and
  transmit equipment 402 arranged for sending, to a User Plane Function, UPF, a session establishment/modification request, wherein said request comprises a usage report rule for request said UPF to notify said SMF of received encrypted DNS queries origination from said UE.

The SMF 401 further comprises a receive terminal 404 via which incoming packets or messages are received and handed over to the receive equipment. Further, a transmit terminal 407 is present via which packets or messages are sent to other nodes in the network.

A control unit 406 is comprised by the SMF 401, which control unit is connected to a memory 405, and to all the elements comprised by the SMF 401, i.e. the receive equipment 404 and the transmit equipment 402.

Other variations to the disclosed examples can be understood and effected by those skilled in the art in practicing the claimed disclosure, from a study of the drawings, the disclosure and the appended claims. In the claims, the word "comprising" does not exclude other elements or steps and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. Within the scope of the present disclosure, a plurality of antenna may be referred to either as "antennae" or "antennas".

A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting scope thereof.

The present disclosure is not limited to the examples as disclosed above, and can be modified and enhanced by those skilled in the art beyond the scope of the present disclosure as disclosed in the appended claims without having to apply inventive skills.

The invention claimed is:

1. A method of supporting encrypted Domain Name Server (DNS) query functionality for a User Equipment (UE) in a telecommunication network, wherein said method comprises the steps of:
    receiving, by a Session Management Function (SMF) from a Policy Control Function (PCF), a policy create message comprising an indication that said UE is subject to said encrypted DNS query functionality; and
    sending, by said SMF to a User Plane Function (UPF), a session establishment/modification request, wherein said request comprises a usage report rule for request said UPF to notify said SMF of received encrypted DNS queries origination from said UE.

2. The method in accordance with claim 1, wherein said method further comprises the steps of:
    receiving, by said SMF, from said UPF, a usage report thereby indicating said SMF of a received encrypted DNS query originating from said UE; and
    sending, by said SMF to said UPF, a usage report acknowledgement.

3. The method in accordance with claim 2, wherein said method further comprises the steps of:
    sending, by said SMF, to a DNS server comprised by said telecommunication network, an Internet Protocol (IP) address query message, wherein said IP address query message comprises an IP address of said UE; and
    receiving, by said SMF, from said DNS server, an IP address query response message, wherein said IP address query response message comprises an IP address and a Domain corresponding to said DNS query origination from said UE.

4. The method in accordance with claim 3, wherein said method further comprises the steps of:
    sending, by said SMF, to said UPF, a session modification request message, wherein said session modification request message comprises said IP address and said Domain corresponding to said DNS query origination from said UE; and
    receiving, by said SMF, from said UPF, a session modification response message.

5. A Session Management Function (SMF) comprised by a telecommunication network arranged for supporting encrypted Domain Name Server (DNS) query functionality for a User Equipment (UE) in the telecommunication network, wherein said SMF comprises:
    receive equipment arranged for receiving, from a Policy Control Function (PCF), a policy create message comprising an indication that said UE is subject to said encrypted DNS query functionality; and
    transmit equipment arranged for sending, to a User Plane Function (UPF), a session establishment/modification request, wherein said request comprises a usage report rule for request said UPF to notify said SMF of received encrypted DNS queries origination from said UE.

6. The SMF comprised by the telecommunication network in accordance with claim 5, wherein said receive equipment is further arranged for receiving, from said UPF, a usage report thereby indicating said SMF of a received encrypted DNS query originating from said UE, and wherein said transmit equipment is further arranged for sending, to said UPF, a usage report acknowledgement.

7. The SMF comprised by the telecommunication network in accordance with claim 6, wherein said transmit equipment is further arranged for sending, to a DNS server comprised by said telecommunication network, an Internet Protocol (IP) address query message, wherein said IP address query message comprises an IP address of said UE, and wherein said receive equipment is further arranged for receiving, from said DNS server, an IP address query response message, wherein said IP address query response message comprises an IP address and a Domain corresponding to said DNS query origination from said UE.

8. The SMF comprised by the telecommunication network in accordance with claim 7, wherein said transmit equipment is further arranged for sending, to said UPF, a session modification request message, wherein said session modification request message comprises said IP address and said Domain corresponding to said DNS query origination from said UE, and wherein said receive equipment is further arranged for receiving, from said UPF, a session modification response message.

* * * * *